US012597979B2

(12) United States Patent
Mu

(10) Patent No.: US 12,597,979 B2
(45) Date of Patent: Apr. 7, 2026

(54) BEAM DETERMINING METHOD AND APPARATUS, AND STORAGE MEDIUM

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 17 days.

(21) Appl. No.: 18/005,729

(22) PCT Filed: Jul. 22, 2020

(86) PCT No.: PCT/CN2020/103615
§ 371 (c)(1),
(2) Date: Jan. 17, 2023

(87) PCT Pub. No.: WO2022/016430
PCT Pub. Date: Jan. 27, 2022

(65) Prior Publication Data
US 2023/0283352 A1     Sep. 7, 2023

(51) Int. Cl.
*H04B 7/06*          (2006.01)
*H04L 5/00*          (2006.01)
(52) U.S. Cl.
CPC ....... *H04B 7/06962* (2023.05); *H04L 5/0048* (2013.01)
(58) Field of Classification Search
CPC ......................... H04L 5/0048; H04B 7/06962
USPC .......................................................... 375/267
See application file for complete search history.

(56) References Cited

U.S. PATENT DOCUMENTS

2017/0353227 A1* 12/2017 Liu ...................... H04B 7/0695
2020/0260416 A1*  8/2020 Kim ...................... H04L 5/0092

FOREIGN PATENT DOCUMENTS

CN          110612693 A      12/2019
WO     WO-2019157755 A1 *  8/2019    ............ H04W 16/14
WO     WO-2019201250 A1 * 10/2019    ............ H04B 7/024

OTHER PUBLICATIONS

International Search Report and Written Opinion of International Application No. PCT/CN2020/103615, mailed Mar. 25, 2021, 13 pages.
The First Office Action issued by The State Intellectual Property Office of People's Republic of China on Dec. 8, 2024, in corresponding Application No. CN 202080001698.2, 32 pages.
The Second Office Action issued by the State Intellectual Property Office of People's Republic of China on Jun. 27, 2025, in corresponding Application No. CN 202080001698.2, 24 pages.

* cited by examiner

*Primary Examiner* — Leila Malek
(74) *Attorney, Agent, or Firm* — Finnegan, Henderson, Farabow, Garrett & Dunner, L.L.P.

(57)          ABSTRACT

A beam determining method is applied to a network device, and includes: determining beam configuration information, wherein the beam configuration information at least includes parameters configured to indicate a receiving beam corresponding to at least one of N repeated transmissions of a downlink channel, where N is a natural number; and determining a transmitting beam corresponding to the at least one of the N repeated transmissions according to beam parameters corresponding to the at least one of the N repeated transmissions of the downlink channel.

20 Claims, 5 Drawing Sheets

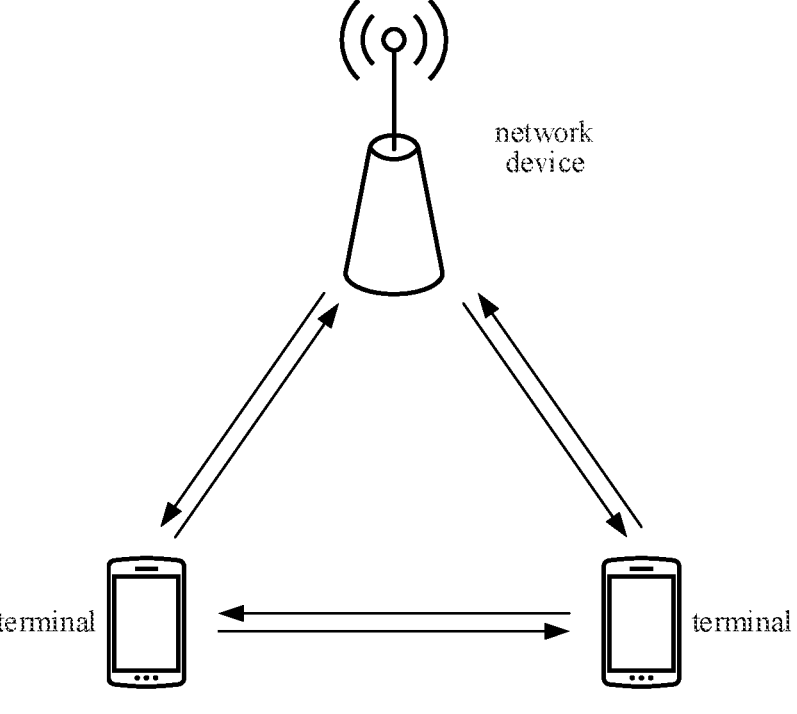

network
device terminal                                        terminal

FIG. 1

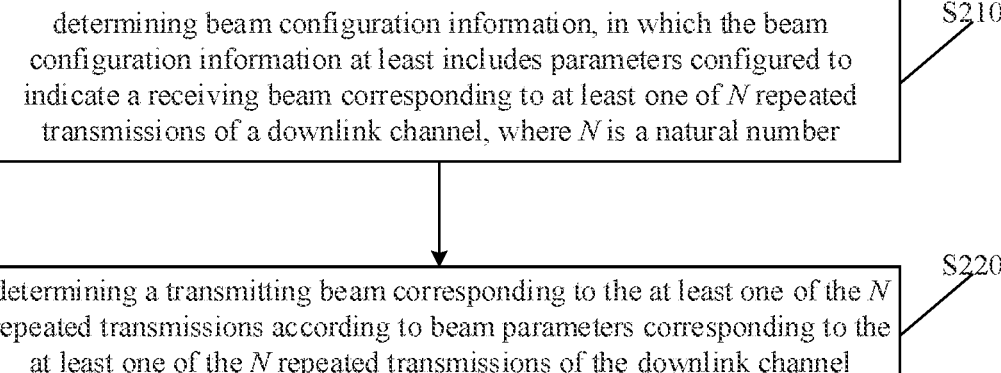

determining beam configuration information, in which the beam
configuration information at least includes parameters configured to
indicate a receiving beam corresponding to at least one of N repeated
transmissions of a downlink channel, where N is a natural number          S210 determining a transmitting beam corresponding to the at least one of the N
repeated transmissions according to beam parameters corresponding to the
at least one of the N repeated transmissions of the downlink channel          S220

FIG. 2

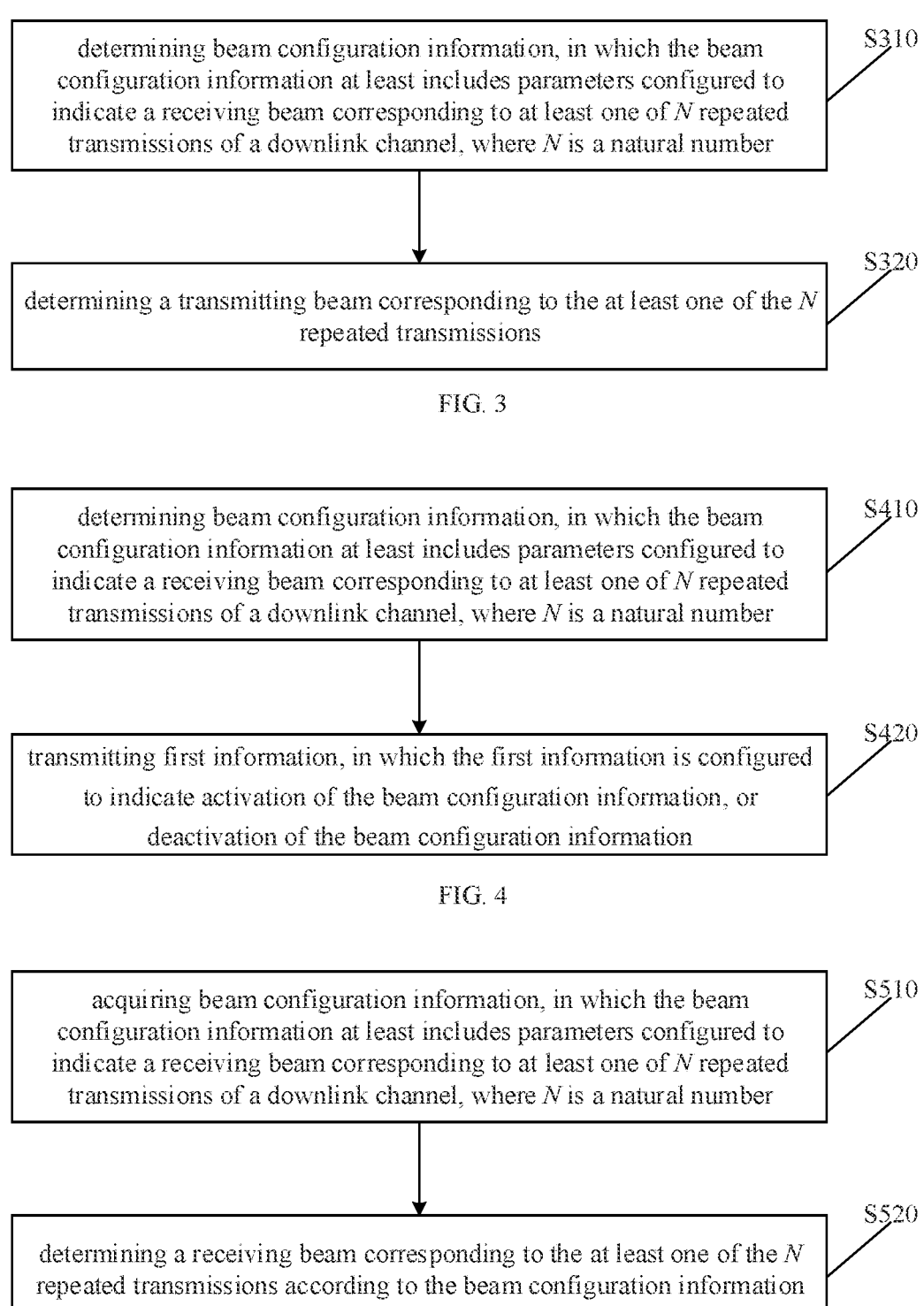

determining beam configuration information, in which the beam configuration information at least includes parameters configured to indicate a receiving beam corresponding to at least one of $N$ repeated transmissions of a downlink channel, where $N$ is a natural number — S310 determining a transmitting beam corresponding to the at least one of the $N$ repeated transmissions — S320

FIG. 3 determining beam configuration information, in which the beam configuration information at least includes parameters configured to indicate a receiving beam corresponding to at least one of $N$ repeated transmissions of a downlink channel, where $N$ is a natural number — S410 transmitting first information, in which the first information is configured to indicate activation of the beam configuration information, or deactivation of the beam configuration information — S420

FIG. 4 acquiring beam configuration information, in which the beam configuration information at least includes parameters configured to indicate a receiving beam corresponding to at least one of $N$ repeated transmissions of a downlink channel, where $N$ is a natural number — S510 determining a receiving beam corresponding to the at least one of the $N$ repeated transmissions according to the beam configuration information — S520

FIG. 5

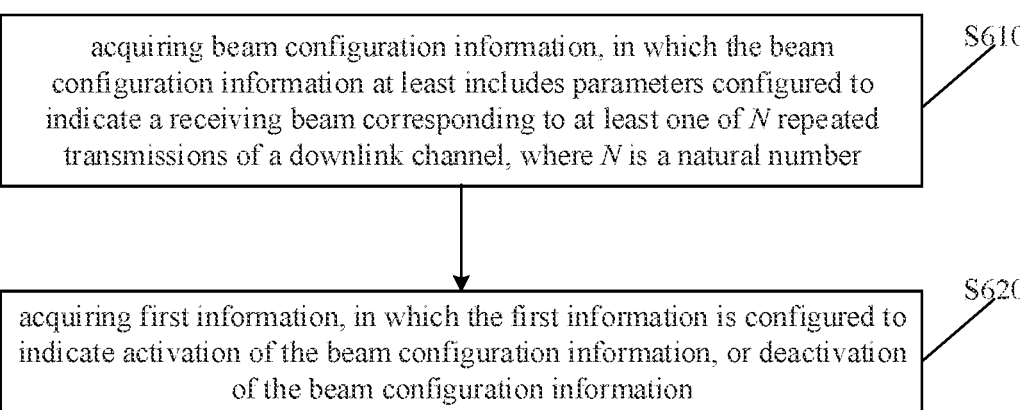

acquiring beam configuration information, in which the beam configuration information at least includes parameters configured to indicate a receiving beam corresponding to at least one of *N* repeated transmissions of a downlink channel, where *N* is a natural number

S610 acquiring first information, in which the first information is configured to indicate activation of the beam configuration information, or deactivation of the beam configuration information

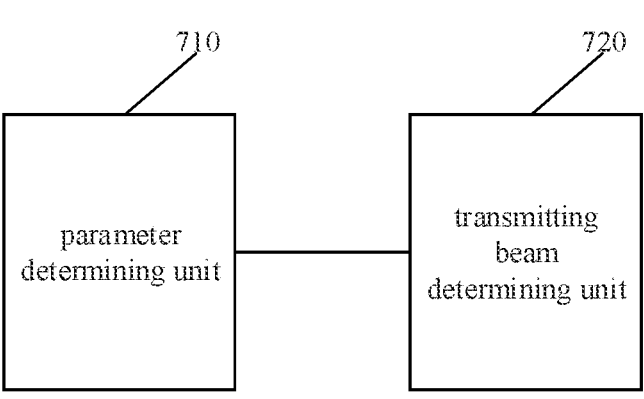

710 parameter determining unit

720 transmitting beam determining unit

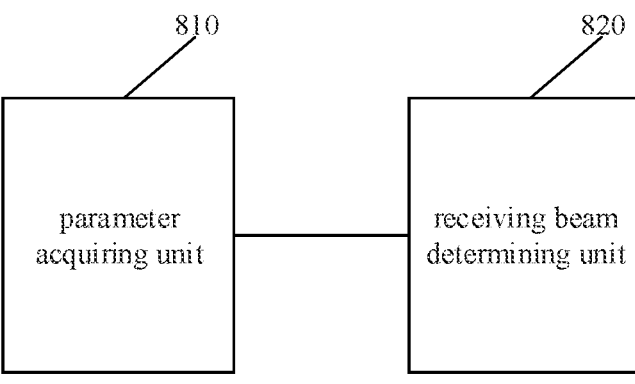

810 parameter acquiring unit

820 receiving beam determining unit

FIG. 8

BEAM DETERMINING METHOD AND APPARATUS, AND STORAGE MEDIUM

CROSS-REFERENCE TO RELATED APPLICATION

This application is a U.S. National Phase application of International Patent Application No. PCT/CN2020/103615, filed Jul. 22, 2020, the entire contents of which are incorporated herein by reference.

FIELD

The present disclosure relates to the technical field of wireless communication, and more particularly, to a beam determining method and apparatus, and a storage medium.

BACKGROUND

In a long term evolution (LTE) 4G system, two technologies, i.e., machine type communication (MTC) and a narrow band Internet of Thing (NB-IoT), are provided in order to support an IoT service. These two technologies are mainly aimed at scenarios with low rate and high delay, such as meter reading, environmental monitoring, and other scenarios. At present, the NB-IoT can only support a maximum rate of several hundred kbps, and the MTC can only support a maximum rate of several Mbps. However, on the other hand, with the continuous development and popularization of the IoT services, such as video monitoring, smart home, a wearable device, and industrial sensor monitoring, these services generally require a higher rate of several tens to 100 Mbps and put forward higher requirements for delay. Therefore, the MTC and NB-IoT technologies in the LTE are difficult to meet the requirements. Based on this situation, many companies propose to design a new user equipment in a 5G new radio (NR) to meet the requirements of these mid-range IoT devices. In the current 3GPP standardization, a new radio lite (NR lite) system introduces a new type of terminal whose transmission delay, rate requirement, and cost are all between a narrow band terminal and an NR terminal. This new type of terminal is referred to as a reduced capability user equipment (RedCap UE).

On the other hand, similar to an IoT device in LTE, a 5G NR-lite device generally needs to meet the requirements of low cost, low complexity, a certain degree of coverage enhancement, and power saving. Since the current NR technology is designed for high-end terminals with high rate and low delay, the current design cannot meet the above requirements of the NR-lite device. Therefore, it is necessary to modify the current NR system to meet the requirements of the NR-lite device. For example, in order to meet the requirements of low cost and low complexity, a radio frequency (RF) bandwidth of the NR-IoT may be limited, for example, to 5 MHz or 10 MHz, or a size of a buffer of the NR-lite is limited, so as to limit a size of each received transmission block. For power saving, a possible optimization direction is to simplify a communication process and reduce the number of times a NR-lite user detect a downlink control channel.

For the NR-lite user, since the capability of the terminal is limited due to for example restrictions on the bandwidth or the number of receiving antennas, coverage of the terminal is negatively affected, so coverage enhancement is needed. A commonly used coverage enhancement scheme is repeated transmission. For example, same information is repeatedly transmitted in a time domain, and combined receipt is performed at the terminal.

In the current 5G NR system, the network may support multi-beam transmission. In downlink transmission, the terminal needs to know the beam used by a base station to transmit information, so that the terminal uses a corresponding receiving beam to receive. In the current 5G NR system, the terminal usually measures and reports N qualified beams for the base station to select. The base station will select an appropriate beam for information transmission according to channel conditions of the terminal.

The RedCap UE needs the coverage enhancement due to limited capabilities. Same control or data may occupy a relatively long time when repeated transmissions are used to compensate for coverage loss to enhance coverage. For a terminal with strong mobility, such as a wearable device, a channel state of the terminal may change during the period of repeated transmissions, and a same beam may not match a dynamically changing channel during the period of repeated transmissions.

SUMMARY

According to a first aspect of the present disclosure, there is provided a beam determining method, which is applied to a network device. The method includes: determining beam configuration information, in which the beam configuration information at least includes parameters configured to indicate a receiving beam corresponding to at least one of N repeated transmissions of a downlink channel, where N is a natural number; and determining a transmitting beam corresponding to the at least one of the N repeated transmissions according to beam parameters corresponding to the at least one of the N repeated transmissions of the downlink channel.

According to a second aspect of the present disclosure, there is provided a beam determining method, which is applied to a terminal. The method includes: acquiring beam configuration information, in which the beam configuration information at least includes parameters configured to indicate a receiving beam corresponding to at least one of N repeated transmissions of a downlink channel, where N is a natural number; and determining a receiving beam corresponding to the at least one of the N repeated transmissions according to the beam configuration information.

According to a third aspect of the present disclosure, there is provided a beam determining apparatus, which is applied to a network device. The beam determining apparatus includes a processor; and a memory for storing instructions executable by the processor; and the processor is configured to perform the beam determining method of the first aspect as described above.

According to a fourth aspect of the present disclosure, there is provided a non-transitory computer-readable storage medium having stored therein instructions that, when executed by a processor of a network device, cause the network device to perform the beam determining method of the first aspect as described above.

According to a fifth aspect of the present disclosure, there is provided a beam determining apparatus, which is applied to a terminal. The beam determining apparatus includes a processor; and a memory for storing instructions executable by the processor; and the processor is configured to perform the beam determining method of the second aspect as described above.

According to an sixth aspect of the present disclosure, there is provided a non-transitory computer-readable storage medium having stored therein instructions that, when executed by a processor of a terminal, cause the terminal to perform the beam determining method of the second aspect as described above.

It is to be understood that both the foregoing general description and the following detailed description are illustratively and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 1 is a schematic diagram showing a wireless communication system according to an illustrative embodiment.

FIG. 2 is a flow chart showing a beam determining method according to an illustrative embodiment.

FIG. 3 is a flow chart showing a beam determining method according to an illustrative embodiment.

FIG. 4 is a flow chart showing a beam determining method according to an illustrative embodiment.

FIG. 5 is a flow chart showing a beam determining method according to an illustrative embodiment.

FIG. 6 is a flow chart showing a beam determining method according to an illustrative embodiment.

FIG. 7 is a block diagram showing a beam determining apparatus according to an illustrative embodiment.

FIG. 8 is a block diagram showing a beam determining apparatus according to an illustrative embodiment.

DETAILED DESCRIPTION

Figure 9:
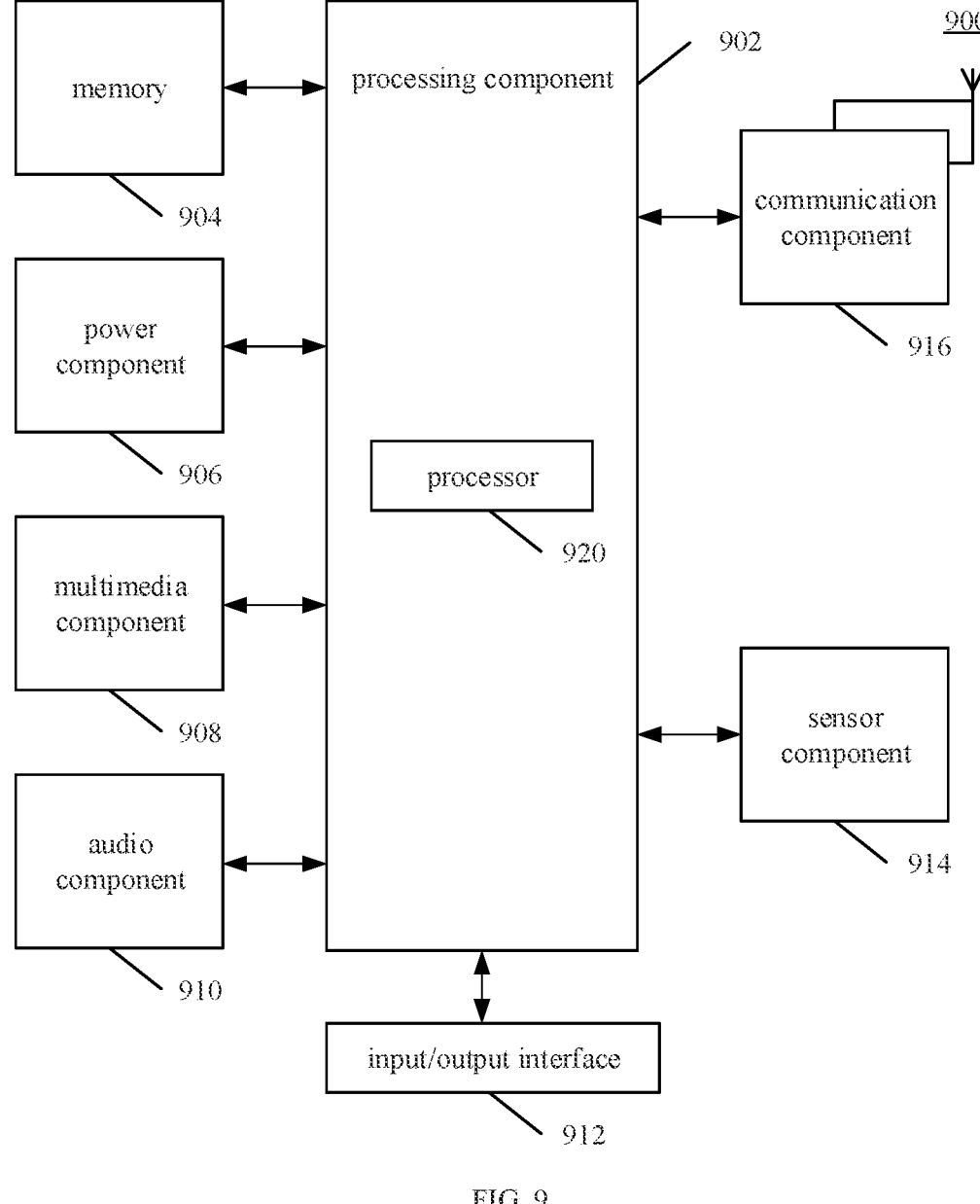
FIG. 9 is a block diagram showing an apparatus for determining a beam according to an illustrative embodiment.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with some aspects of the present disclosure as recited in the appended claims.

A beam determining method provided in embodiments of the present disclosure may be applied to a wireless communication system shown in FIG. 1. Referring to FIG. 1, the wireless communication system includes a network device and a terminal. The terminal is connected to the network device through a wireless resource to perform data transmission.

It may be understood that the wireless communication system shown in FIG. 1 is merely for the purpose of illustration. The wireless communication system may further include other network devices, such as a core network device, a wireless relay device, and a wireless backhaul device, etc., which are not shown in FIG. 1. Embodiments of the present disclosure do not limit the number of the network devices and the number of the terminals included in the wireless communication system.

It may be further understood that the wireless communication system described in embodiments of the present disclosure is a network providing a wireless communication function. The wireless communication system may adopt different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), carrier sense multiple access with collision avoidance (CSMA/CA). The network may be classified into a 2nd generation (2G) network, a 3G network, a 4G network or a future evolution network, such as a 5G network (also referred to as a 5G new radio) according to the capacity, rate, delay and other factors of different networks. For ease of description, a wireless communication network may be named as a network for short sometimes in the present disclosure.

Further, the network device involved in the present disclosure may also be referred to as a radio access network device. The radio access network device may be a base station, an evolved NodeB (eNodeB or eNB), a home base station, an access point (AP) in a wireless fidelity (WIFI) system, a wireless relay node, a wireless backhaul node, a transmission point (TP), or a transmission and reception point (TRP), etc., or may also be a base station (gNodeB or gNB) in a NR system, or may also be a component or a device of a base station, etc. It is to be understood that the technology and the device form adopted by the network device are not limited in embodiments of the present disclosure. In the present disclosure, the network device may provide communication coverage for a specific geographic area, and may communicate with a terminal located within the coverage area (cell). In addition, the network device may also be a vehicle-mounted device when the wireless communication system is a vehicle to everything (V2X) communication system.

Further, the terminal involved in the present disclosure, which may also be referred to as a terminal device, a user equipment (UE), a mobile station (MS), a mobile terminal (MT), etc., is a device that provides voice and/or data connectivity to a user. For example, the terminal may be device having a wireless connection function, such as a handheld device, a vehicle-mounted device, or the like. At present, some examples of the terminal are a mobile phone, a pocket personal computer (PPC), a palmtop computer, a personal digital assistant (PDA), a notebook computer, a tablet computer, a wearable device, or a vehicle-mounted device, etc. In addition, the terminal device may also be a vehicle-mounted device when the wireless communication system is a vehicle to everything (V2X) communication system. It is to be understood that embodiments of the present disclosure do not limit the technology and the device form adopted by the terminal.

In the current 5G NR system, the network may support multi-beam transmission. In downlink transmission, the terminal needs to know a beam used by a base station to transmit information, so that the terminal uses a corresponding receiving beam to receive. In the current 5G NR system, the terminal usually measures and reports N qualified beams for the base station to select. The base station will select an appropriate beam for information transmission according to channel conditions of the terminal.

In particular, for a physical downlink control channel (PDCCH), beam management takes the following points.

For a certain control resource set (CORESET), the network configures N candidate beams for the CORESET through radio resource control (RRC) layer signaling. For a certain CORESET, the network activates one of the beams using a media access control element (MAC CE). For a certain CORESET, a user will receive information of the CORESET according to a corresponding activated beam. Since a channel state of the user is constantly changing, the beam used is also changing, so dynamic switching is needed. For a control channel, a way that can be taken to realize the dynamic beam switching is to configure a plurality of CORESETs for the user, each CORESET is configured with different beams, and the base station may place a PDCCH in different CORESETs according to channel conditions to realize switching of different beams.

For a downlink data channel, a flow of beam management is that high-level signaling configures multiple candidate beams for a user, and downlink control information (DCI) in the PDCCH indicates a specific beam in a candidate beam subset.

However, a RedCap UE needs coverage enhancement due to its limited capability. However, same control or data will occupy a relatively long time when repeated transmissions are used to compensate for coverage loss to enhance coverage. For a terminal with strong mobility, such as a wearable device, a channel state of the terminal may change during the period of repeated transmissions, which results in that a same beam may not match a dynamically changing channel during the period of repeated transmissions.

Embodiments of the present disclosure design a new downlink beam determining method, which may provide good beam management in case of enhanced coverage. Specifically, in embodiments of the present disclosure, by performing dynamic beam switching during the repeated transmissions of the downlink channel, even when repeated transmitting and repeated reception are used to enhance coverage, the transmitting beam and the receiving beam matching the channel may be used during the time period of repeated transmitting and repeated reception of the downlink channel, thereby reducing delay and increasing transmission efficiency.

Embodiments of the present disclosure provide a beam determining method, which is applied to a network device. FIG. 2 is a flow chart showing a beam determining method according to an illustrative embodiment. Referring to FIG. 2, the beam determining method is applied to a network device, and includes steps S210 and S220.

In step S210, beam configuration information is determined, the beam configuration information at least includes parameters configured to indicate a receiving beam corresponding to at least one of N repeated transmissions of a downlink channel, where N is a natural number.

In step S220, a transmitting beam corresponding to the at least one of the N repeated transmissions is determined according to beam parameters corresponding to the at least one of the N repeated transmissions of the downlink channel.

According to embodiments of the present disclosure, the beam configuration information is determined, and the beam configuration information at least includes parameters configured to indicate the receiving beam corresponding to at least one of N repeated transmissions of the downlink channel, where N is a natural number. In some embodiments, transmitting beams and/or receiving beams used in the N repeated transmissions are not fully identical. Specifically, the network device determines, according to the beam configuration information, at least two different transmitting beams used in the N repeated transmissions, where N is a natural number. In addition, a terminal determines, according to the beam configuration information, a receiving beam used in the N repeated transmissions. That is to say, the transmitting beam of the network device and/or the receiving beam of the terminal are changed at least once in the N repeated transmissions.

In embodiments of the present disclosure, based on the parameters included in the beam configuration information, during the repeated transmissions of the downlink channel, a corresponding beam is used or beam switching is performed according to a rule or an instruction determined by the beam configuration information. For the $n^{th}$ repeated transmission, the network device takes the transmitting beam determined in the beam configuration information as a transmitting beam used in the $n^{th}$ repeated transmission, where n E N. The terminal takes the receiving beam determined in the beam configuration information as a receiving beam used in the $n^{th}$ repeated transmission. For multiple repeated transmissions, the network device determines one or more transmitting beams in the N repeated transmissions according to the beam configuration information, and the terminal determines one or more receiving beams in the N repeated transmissions according to the beam configuration information. It may also be that the network device adopts corresponding transmitting beams for transmission in turn according to a beam switching sequence determined in beam switching information, and the terminal adopts corresponding receiving beams for reception according to the rule or adjustment notification. Therefore, by designating the transmitting beam and the receiving beam used in a certain repeated transmission of the downlink channel, or changing the transmitting beam and the receiving beam during the multiple repeated transmissions of the downlink channel, the transmitting beam and the receiving beam matched with the channel can be used during the time period of repeated transmissions of the downlink channel. This is beneficial to reduce delay and increase transmission efficiency. In addition, since the beam configuration information as described above may be specified in rules such as protocols, or indicated in signaling such as high-layer signaling or physical-layer signaling, signaling overhead may be saved.

The beam determining method according to embodiments of the present disclosure is applied to a process of repeated transmissions of the downlink channel. Specifically, the beam determining method described above not only may be applied to a process of repeated transmissions in a physical downlink shared channel (PDSCH), but also may be applied to a process of repeated transmissions of a physical downlink control channel (PDCCH).

FIG. 3 is a flow chart showing a beam determining method according to an illustrative embodiment. Referring to FIG. 3, the beam determining method is applied to a network device, and includes steps S310 and S320.

In step S310, beam configuration information is determined, and the beam configuration information at least includes parameters configured to indicate a receiving beam corresponding to at least one of N repeated transmissions of a downlink channel, where N is a natural number In step S320, a transmitting beam corresponding to the at least one of the N repeated transmissions is determined.

In some embodiments of the present disclosure, in step S320 shown in FIG. 3, based on the beam configuration information, a transmission beam used for at least one of the N repeated transmissions is determined. Or, based on the beam configuration information, transmission beams used for at least two repeated transmissions of the multiple repeated transmissions are determined, in which the transmission beams used for the at least two repeated transmissions are different. Specifically, for the network device, a transmitting beam used in the $n^{th}$ repeated transmission (i.e., the $n^{th}$ repeated transmitting) is determined based on the beam switching information, and the $n^{th}$ repeated transmission is completed by using the transmitting beam, or parameter change of the transmitting beam in the multiple repeated transmissions (i.e., the N repeated transmissions) of the downlink channel is determined based on the beam switching information.

In some embodiments of the present disclosure, a beam is determined to use according to a communication protocol or a received control signaling during a certain repeated transmission of the downlink channel, and the beam is changed during the repeated transmissions of the downlink channel according to the communication protocol or the signaling. The network device takes a predetermined beam as the transmitting beam in the $n^{th}$ repeated transmission, and/or changes the transmitting beam in the multiple repeated transmissions, according to the notification or the rule.

In some embodiments of the present disclosure, a transmitting beam corresponding to one or more repeated transmissions of the multiple repeated transmissions is determined. A receiving beam used for the one or more repeated transmissions is indicated to a receiving end via the beam configuration information.

In some embodiments of the present disclosure, transmission beams corresponding to the N repeated transmissions are not fully identical, or transmission beams corresponding to the N repeated transmissions are fully different. The case where the transmission beams corresponding to the N repeated transmissions are not fully identical means that the N repeated transmissions correspond to at least two transmission beams, that is, some of the N repeated transmissions correspond to a first transmission beam, and some of the N repeated transmissions correspond to a second transmitting beam. The case where the transmission beams corresponding to the N repeated transmissions are fully different means that the N repeated transmissions correspond to N transmission beams, and the transmission beam changes for each repeated transmission. It should be noted that the transmission beam used herein refers to the transmitting beam and the receiving beam. Certainly, in a same repeated transmission, the transmitting beam used by the transmitting end should correspond to the receiving beam used by the receiving end.

As described in detail below, for the network device and the terminal, the transmitting beam and the receiving beam used in the $n^{th}$ repeated transmission are determined by candidate beams and candidate beam switching patterns in the multiple repeated transmissions.

In some embodiments of the present disclosure, the beam configuration information may include a first beam parameter. The first beam parameter is configured to indicate two or more candidate beams used in the N repeated transmissions. In some embodiments of the present disclosure, the candidate beams are determined from a candidate beam set. In some embodiments of the present disclosure, the beam configuration information may be instructed by DCI or MAC CE. For example, the first beam parameter in the beam configuration information is configured to indicate two or more candidate beams, so that switching may be performed between the two or more candidate beams during the N repeated transmissions. Certainly, the receiving end knows parameters of the receiving beam corresponding to each transmitting beam used by the transmitting end. For another example, the first beam parameter in the beam configuration information is configured to indicate two or more candidate beam sets, in which one candidate beam set includes a candidate beam used by a transmitting end in a transmitting process and a candidate beam used by a receiving end in a receiving process, and another candidate beam set includes a candidate beam used by a transmitting end in a transmitting process and a candidate beam used by a receiving end in a receiving process during another repeated transmission.

In some embodiments of the present disclosure, multiple candidate beams are configured for the receiving end through high-layer signaling, for example, a candidate beam set of 32 candidate beams numbered #1 to #32. In other embodiments, the candidate beam set may be determined based on a protocol, for example, a candidate beam set of 32 candidate beams numbered #1 to #32. Two or more candidate beams used in the N repeated transmissions are indicated by the first beam parameter.

In some embodiments of the present disclosure, the beam switching information may include a second beam parameter that is configured to indicate at least two candidate beam patterns. Each candidate beam pattern at least includes a first candidate beam used by a transmitting end in a transmitting process and a second candidate beam used by a receiving end in a receiving process during one repeated transmission. The first candidate beam and the second candidate beam are determined from the candidate beam set. In some embodiments of the present disclosure, a candidate beam pattern may be configured for each of the N repeated transmissions, that is, a total of N candidate beam patterns are configured.

In some embodiments of the present disclosure, for example, one candidate beam pattern includes the first candidate beam and the second candidate beam, the first candidate beam may be a transmitting beam used by the network device in a $n^{th}$ repeated transmission, and the second candidate beam may be a receiving beam used by the terminal in receiving the $n^{th}$ repeated transmission, where $n \in N$.

For example, on the basis of the above-mentioned candidate beams #1 to #32, it is further determined via RRC signaling or MAC CE that the second beam parameter includes four candidate beam patterns, which are $\{(\#1, \#2), (\#2, \#3), (\#1, \#4),$ and $(\#4, \#5)\}$, respectively. That is, a total of four repeated transmissions are performed, and the four repeated transmissions correspond to the above-mentioned four candidate beam patterns, respectively. Taking the first candidate beam pattern (#1, #2) in the above-mentioned candidate beam patterns as an example for illustration, the first candidate beam is the candidate beam #1, which may be a transmitting beam used by the network device in a first repeated transmission, and the second candidate beam is the candidate beam #2, which may be a receiving beam used by the terminal in receiving the first repeated transmission.

For example, the network device switches the transmitting beam in four repeated transmissions according to the above-mentioned four candidate beam patterns, and the terminal switches the receiving beam in the four repeated transmissions according to the above-mentioned candidate beam patterns. For example, the above-mentioned candidate beam patterns are $\{(\#1, \#2), (\#2, \#3), (\#1, \#4),$ and $(\#4, \#5)\}$, the network device uses the candidate beam #1 as a transmitting beam in a first repeated transmission, and the terminal uses a candidate beam #2 as a receiving beam in the first repeated transmission; the network device uses the candidate beam #2 as a transmitting beam in a second repeated transmission, and the terminal uses the candidate beam #3 as a receiving beam in the second repeated transmission; the network device uses the candidate beam #1 as a transmitting beam in a third repeated transmission, and the terminal uses the candidate beam #4 as a receiving beam in the third repeated transmission; and the network device uses the candidate beam #4 as a transmitting beam in a fourth repeated transmission, and the terminal uses the candidate beam #5 as a receiving beam in the fourth repeated transmission.

It is to be pointed out that in all embodiments of the present disclosure, the first beam parameter and the second beam parameter may exist independently, or coexist.

In some embodiments of the present disclosure, the beam configuration information is configured to indicate one candidate beam pattern determined from a plurality of candidate beam patterns for use in one repeated transmission of the downlink channel. For example, the candidate beam pattern used in one repeated transmission may be further indicated by DCI or MAC CE.

In some embodiments of the present disclosure, the beam configuration information is configured to indicate a beam pattern composed of a third candidate beam and a fourth candidate beam determined from multiple candidate beams. In an illustrative embodiment, candidate switching beams may be directly indicated by DCI. For example, two candidate switching beams, i.e., the third candidate beam and the fourth candidate beam, may be directly indicated by DCI. It is to be pointed out here that the two candidate switching beams directly indicated by the DCI may be any two candidate beams in the above-mentioned multiple candidate beams. That is to say, the third candidate beam and the fourth candidate beam may refer to the above description of the first candidate beam and/or the second candidate beam.

It is to be pointed out that the number of candidate switching beams and the number and combination of beam switching patterns as described above are merely illustrative. The number of candidate switching beams and the number and combination of beam switching patterns may be pre-configured according to the network device, the terminal, and factors such as application scenarios, and embodiments of the present disclosure are not limited thereto.

In some embodiments of the present disclosure, the beam configuration information may include a duration of each candidate beam or time granularity for beam switching. For example, when two or more repeated transmissions correspond to different transmitting beams, the duration of the candidate beam or the time granularity for the beam switching may be used to determine the timing of changing the transmitting beam.

The duration of each candidate beam may be determined by absolute time of transmitting the candidate beam, or by relative time (i.e., a time offset) relative to a reference point, or by the number of repeated transmissions corresponding to the candidate beam (i.e., the time granularity for beam switching). For example, the duration of each candidate beam in the beam pattern or the time granularity for beam switching (e.g., the number of information transmissions using a certain candidate beam) may be configured by signaling, or determined according to a communication protocol.

In some embodiments of the present disclosure, the duration or the time granularity for beam switching is determined according to at least one of the following parameters: granularity of frequency hopping, granularity of variation of a pre-coded matrix in a time domain, granularity of redundant version (RV) transformation, or a number of repeated transmissions for a terminal.

In some embodiments of the present disclosure, the duration or the time granularity for beam switching may be determined by the network device and transmitted to the terminal, or may be determined by the network device and the terminal in a same manner, respectively.

Referring to the following table, it is illustratively described that the time granularity for beam switching is determined according to the number of repeated transmissions of the network device or the terminal. For example, when the number of repeated transmissions of the network device or the terminal is greater than 8, for example, when the number of repeated transmissions is 10 or 16, the time granularity for beam switching is set to 4, that is, the candidate beam pattern is switched every four repeated transmissions. For example, when the number of repeated transmissions of the network device or the terminal is less than 9, for example, when the number of repeated transmissions is 4, the time granularity for beam switching is set to 2, that is, the candidate beam pattern is switched every two repeated transmissions.

| the number of repeated transmissions | time granularity for beam switching |
| --- | --- |
| >8 | 4 |
| <9 | 2 |

The time granularity for beam switching has been described above with reference to the example where the time granularity for beam switching is determined according to the number of repeated transmissions. It is to be noted that the time granularity for beam switching may also be determined according to the granularity of frequency hopping, the granularity of variation of the pre-coded matrix in the time domain, or the granularity of redundant version (RV) transformation.

Embodiments of the present disclosure also provide a technical solution of beam switching for physical downlink control channel (PDCCH) transmission. For a PDCCH, the beam switching under a same CORESET is not supported in the related art. Embodiments of the present disclosure provide a technical solution of beam switching in repeated transmissions for CORESET.

In some embodiments of the present disclosure, the solution of beam switching in repeated transmissions for CORESET includes: determining beam configuration information. The beam configuration information at least includes a parameter (also referred to as a third beam parameter in some embodiments of the present disclosure) configured to indicate at least two control resource sets (CORESETs) for repeated transmissions of the PDCCH. In some embodiments of the present disclosure, different CORESETs use different candidate beams. In the above technical solution, the repeated transmissions of a same physical downlink control channel (PDCCH) are performed in the at least two CORESETs. For example, a plurality of CORESETs are configured, different CORESETs use different candidate beams, and multiple repeated transmissions of a same PDCCH are performed in the plurality of CORESETs. For example, CORESET #1 corresponds to the candidate beam #1, and CORESET #2 corresponds to the candidate beam #2. If the transmission needs to be switched in the candidate beam #1 and the candidate beam #2, and the granularity for each switching is two time units, two transmissions are performed in the PDCCH using the candidate beam #1 in the CORESET #1, and two transmissions are performed using the candidate beam #2 in the CORESET #2. Back and forth like this. In these embodiments, for the definitions of the candidate beams and the candidate beam set, reference may be made to any other embodiment of the present disclosure, which will not be elaborated herein.

Embodiment of the present disclosure also provide a technical solution of beam switching for physical downlink control channel (PDCCH) transmission. The technical solution includes determining beam configuration information. The beam configuration information at least includes a parameter (also referred to as a fourth beam parameter in some embodiments of the present disclosure) configured to indicate two or more candidate beams corresponding to a control resource set (CORESET) for repeated transmissions of the PDCCH, and different candidate beams are used for transmission in the CORESET. The fourth beam parameter is configured to indicate two or more candidate beams in the multiple candidate beams, at least two candidate beams correspond to a same CORESET, and at least two repeated transmissions of a same PDCCH are carried out in the same CORESET using different candidate beams. For example, the existing beam determining method for the CORESET is re-modified. For the same CORESET, multiple candidate beams are activated in the MAC CE. Then, the same CORESET is used for the transmission of the PDCCH, and the used candidate beam is switched when the same CORE-SET is transmitted. For example, the timing of switching the used candidate beam may be determined according to a time parameter.

In some embodiments of the present disclosure, the beam determining method further includes transmitting first information, and the first information is configured to indicate activation of the beam configuration information. In some embodiments of the present disclosure, the beam determining method further includes transmitting first information, and the first information is configured to indicate deactivation of the beam configuration information. For example, whether to use the beam switching method as described above in repeated transmissions may be configured by signaling.

That is, in embodiments of the present disclosure, the network device may configure a corresponding terminal whether to activate the beam configuration information as described above by the first information. In some possible implementations, the beam configuration information may be transmitted to terminals in a broadcast manner, and each terminal may be individually instructed whether to activate the beam configuration information through the first information. This way can save signaling overhead. In some possible implementations, the beam configuration information may be transmitted to each terminal in a broadcast manner, and each terminal may be individually instructed whether to activate the beam configuration information through the first information or any other appropriate information. This way can save signaling overhead. In some possible implementations, multiple beam configuration information may be transmitted to terminals in a broadcast manner, and each terminal may be individually instructed whether to activate the beam configuration information and instructed to activate beam switching information in the multiple beam configuration information through the first information or any other appropriate information. This way may save signaling overhead.

FIG. 4 is a flow chart showing a beam determining method according to an illustrative embodiment. Referring to FIG. 4, the beam determining method is applied to a network device, and includes steps S410 and S420.

In step S410, beam configuration information is determined, and the beam configuration information at least includes parameters configured to indicate a receiving beam corresponding to at least one of N repeated transmissions of a downlink channel, where N is a natural number.

The network device determines a transmitting beam used in an $n^{th}$ repeated transmission based on the beam switching information, where $n \in N$. In some embodiments of the present disclosure, transmission beams corresponding to the N repeated transmissions are not fully identical, or transmission beams corresponding to the N repeated transmissions are completely different from each other.

In step S420, first information is transmitted, and the first information is configured to indicate activation of the beam configuration information, or deactivation of the beam configuration information.

In all embodiments of the present disclosure, the order of the steps S410 and S420 as described above may be adjusted arbitrarily. That is, the step S420 of transmitting the first information configured to indicate activation or deactivation of the beam configuration information may be performed at any time slot of the method, which is not limited in embodiments of the present disclosure.

In an embodiment of the present disclosure, the beam configuration mechanism described above may be activated or deactivated through high-layer signaling or physical-layer signaling. For example, whether to activate or deactivate the beam configuration mechanism described above is indicated in a certain fixed information field of the high-layer signaling or the physical-layer signaling. In an embodiment of the present disclosure, for example, "0" represents activation, and "1" represents deactivation. Information in the physical-layer signaling for detecting activation or deactivation may be pre-configured.

In some examples, whether to use the beam switching method as described above in repeated transmissions is configured according to the mobility of a user. For example, this method is deactivated (i.e., not used) when the mobility of the user is relatively low, and activated when the mobility of the user is relatively high. In other examples, it is determined according to a type of a user. For example, for a device such as a video monitor or an industrial sensor, a traditional beam management method is adopted, but for a wearable device, the beam switching method described above is adopted for configuration.

In some embodiments of the present disclosure, the beam switching information further includes a quasi co-location (QCL) hypothesis, or multiple transmission configuration indications (TCIs). That is to say, in some embodiments of the present disclosure, the beam configuration information as described above may be embodied as configuration of the quasi co-location (QCL) hypothesis or configuration of the multiple transmission configuration indications (TCIs) in the high-layer signaling, etc., that is, the above-described beam configuration information may be embodied in a protocol.

The QCL of antenna ports is defined as follows. If the UE is allowed to derive "large-scale channel attributes" of a port (port A) (for example, those needed for channel estimation/time-frequency synchronization based on the port A) from measurements on another port (port B), the port A is considered to be quasi co-located with the port B. For example, these large-scale channel attributes may include one or more of the following attributes: delay spread, Doppler spread, frequency shift, average received power (which may merely be needed between ports of the same type), and reception timing. Another definition of the QCL of antenna ports is as follows. If two antenna ports are quasi co-located, the UE may assume that large-scale attributes of a channel transmitting symbols of an antenna port can be inferred from a channel transmitting symbols of another antenna port. For example, the large-scale attributes in the above definition may include one or more of the following attributes: delay spread, Doppler spread, Doppler frequency shift, average gain, and average delay.

In some embodiments of the present disclosure, using QCL hypothesis of antenna ports may reduce signaling overhead and time for channel estimation or time/frequency synchronization.

Based on the same concept, embodiments of the present disclosure further provide a beam determining method, which is applied to a terminal. FIG. 5 is a flow chart showing a beam determining method according to an illustrative embodiment. Referring to FIG. 5, the beam determining method is applied to a terminal, and includes steps S510 and S520.

In step S510, beam configuration information is determined, and the beam configuration information at least includes parameters configured to indicate a receiving beam corresponding to at least one of N repeated transmissions of a downlink channel, where N is a natural number.

In step S520, a receiving beam corresponding to the at least one of the N repeated transmissions is determined according to the beam configuration information.

In some embodiments of the present disclosure, a transmitting beam corresponding to one or more repeated transmissions of the multiple repeated transmissions is determined. A receiving beam used for the one or more repeated transmissions is indicated to a receiving end via the beam configuration information.

In some embodiments of the present disclosure, transmission beams corresponding to the N repeated transmissions are not fully identical, or transmission beams corresponding to the N repeated transmissions are fully different. The case where the transmission beams corresponding to the N repeated transmissions are not fully identical means that the N repeated transmissions correspond to at least two transmission beams, that is, some of the N repeated transmissions correspond to a first transmission beam, and some of the N repeated transmissions correspond to a second transmitting beam. The case where the transmission beams corresponding to the N repeated transmissions are fully different means that the N repeated transmissions correspond to N transmission beams, and the transmission beam changes for each repeated transmission. It should be noted that the transmission beam used herein refers to the transmitting beam and the receiving beam. Certainly, in a same repeated transmission, a corresponding relationship between a transmitting beam used by a transmitting end and a receiving beam used by a receiving end may be determined in any manner, for example, the corresponding relationship may be determined based on a communication protocol, or configured to the terminal after being determined by the network device.

In some embodiments of the present disclosure, in step S520 shown in FIG. 5, a transmission beam used in an $n^{th}$ repeated transmission is determined, or the transmission beam is switched in multiple repeated transmissions, based on the beam configuration information. Specifically, for the terminal, a receiving beam used in the $n^{th}$ repeated transmission is determined based on the beam switching information, and complete the reception of the $n^{th}$ repeated transmission by using the receiving beam, or it is determine that the receiving beam is switched during the multiple repeated transmissions (i.e., receiving the multiple repeated transmissions) of the downlink channel based on the beam switching information.

In some embodiments of the present disclosure, the beam configuration information may include a first beam parameter. The first beam parameter is configured to indicate two or more candidate beams used in the N repeated transmissions. In some embodiments of the present disclosure, the candidate beams are determined from a candidate beam set. In some embodiments of the present disclosure, the beam configuration information may be instructed by DCI or MAC CE. For example, the first beam parameter in the beam configuration information is configured to indicate two or more candidate beams, so that switching may be performed between the two or more candidate beams during the N repeated transmissions. Certainly, the receiving end knows parameters of the receiving beam corresponding to each transmitting beam used by the transmitting end. For another example, the first beam parameter in the beam configuration information is configured to indicate two or more candidate beam sets, in which one candidate beam set includes a candidate beam used by a transmitting end in a transmitting process and a candidate beam used by a receiving end in a receiving process, and another candidate beam set includes a candidate beam used by a transmitting end in a transmitting process and a candidate beam used by a receiving end in a receiving process during another repeated transmission.

In some embodiments of the present disclosure, the beam switching information may include a second beam parameter that is configured to indicate at least two candidate beam patterns. Each candidate beam pattern at least includes a first candidate beam used by a transmitting end in a transmitting process and a second candidate beam used by a receiving end in a receiving process during one repeated transmission. The first candidate beam and the second candidate beam are determined from the candidate beam set. In some embodiments of the present disclosure, a candidate beam pattern may be configured for each of the N repeated transmissions, that is, a total of N candidate beam patterns are configured.

In some embodiments of the present disclosure, for example, one candidate beam pattern includes the first candidate beam and the second candidate beam, the first candidate beam may be a transmitting beam used by the network device in a $n^{th}$ repeated transmission, and the second candidate beam may be a receiving beam used by the terminal in receiving the $n^{th}$ repeated transmission, where $n \in N$.

For example, on the basis of the above-mentioned candidate beams #1 to #32, it is further determined via RRC signaling or MAC CE that the second beam parameter includes four candidate beam patterns, which are {(#1, #2), (#2, #3), (#1, #4), and (#4, #5)}, respectively. That is, a total of four repeated transmissions are performed, and the four repeated transmissions correspond to the above-mentioned four candidate beam patterns, respectively. Taking the first candidate beam pattern (#1, #2) in the above-mentioned candidate beam patterns as an example for illustration, the first candidate beam is the candidate beam #1, which may be a transmitting beam used by the network device in a first repeated transmission, and the second candidate beam is the candidate beam #2, which may be a receiving beam used by the terminal in receiving the first repeated transmission.

For example, the network device switches the transmitting beam in four repeated transmissions according to the above-mentioned four candidate beam patterns, and the terminal switches the receiving beam in the four repeated transmissions according to the above-mentioned candidate beam patterns. For example, the above-mentioned candidate beam patterns are {(#1, #2), (#2, #3), (#1, #4), and (#4, #5)}, the network device uses the candidate beam #1 as a transmitting beam in a first repeated transmission, and the terminal uses a candidate beam #2 as a receiving beam in the first repeated transmission, the network device uses the candidate beam #2 as a transmitting beam in a second repeated transmission, and the terminal uses the candidate beam #3 as a receiving beam in the second repeated transmission; the network device uses the candidate beam #1 as a transmitting beam in a third repeated transmission, and the terminal uses the candidate beam #4 as a receiving beam in the third repeated transmission: and the network device uses the candidate beam #4 as a transmitting beam in a fourth repeated transmission, and the terminal uses the candidate beam #5 as a receiving beam in the fourth repeated transmission.

It is to be pointed out that in all embodiments of the present disclosure, the first beam parameter and the second beam parameter may exist independently, or coexist.

In some embodiments of the present disclosure, the beam configuration information is configured to indicate one candidate beam pattern determined from a plurality of candidate beam patterns for use in one repeated transmission of the downlink channel. For example, the candidate beam pattern used in one repeated transmission may be further indicated by DCI or MAC CE.

In some embodiments of the present disclosure, the beam configuration information is configured to indicate a beam pattern composed of a third candidate beam and a fourth candidate beam determined from multiple candidate beams. In an illustrative embodiment, candidate switching beams may be directly indicated by DCI. For example, two candidate switching beams, i.e., the third candidate beam and the fourth candidate beam, may be directly indicated by DCI. It is to be pointed out here that the two candidate switching beams directly indicated by the DCI may be any two candidate beams in the above-mentioned multiple candidate beams. That is to say, the third candidate beam and the fourth candidate beam may refer to the above description of the first candidate beam and/or the second candidate beam.

It is to be pointed out that the number of candidate switching beams and the number and combination of beam switching patterns as described above are merely illustrative. The number of candidate switching beams and the number and combination of beam switching patterns may be pre-configured according to the network device, the terminal, and factors such as application scenarios, and embodiments of the present disclosure are not limited thereto.

In some embodiments of the present disclosure, the beam configuration information may include a duration of each candidate beam or time granularity for beam switching. For example, when two or more repeated transmissions correspond to different transmitting beams, the duration of the candidate beam or the time granularity for the beam switching may be used to determine the timing of changing the transmitting beam.

The duration of each candidate beam may be determined by absolute time of transmitting the candidate beam, or by relative time (i.e., a time offset) relative to a reference point, or by the number of repeated transmissions corresponding to the candidate beam (i.e., the time granularity for beam switching). For example, the duration of each candidate beam in the beam pattern or the time granularity for beam switching (e.g., the number of information transmissions using a certain candidate beam) may be configured by signaling, or determined according to a communication protocol.

In some embodiments of the present disclosure, the duration or the time granularity for beam switching is determined according to at least one of the following parameters: granularity of frequency hopping, granularity of variation of a pre-coded matrix in a time domain, granularity of RV transformation, or a number of repeated transmissions for a terminal.

In some embodiments of the present disclosure, the duration or the time granularity for beam switching may be determined by the network device and transmitted to the terminal, or may be determined by the network device and the terminal in a same manner, respectively.

Embodiments of the present disclosure also provide a technical solution of beam switching for physical downlink control channel (PDCCH) transmission. For a PDCCH, the beam switching under a same CORESET is not supported in the related art. Embodiments of the present disclosure provide a technical solution of beam switching in repeated transmissions for CORESET.

In some embodiments of the present disclosure, the solution of beam switching in repeated transmissions for CORESET includes: determining beam configuration information. The beam configuration information at least includes a parameter (also referred to as a third beam parameter in some embodiments of the present disclosure) configured to indicate at least two control resource sets (CORESETs) for repeated transmissions of the PDCCH. In some embodiments of the present disclosure, different CORESETs use different candidate beams. In the above technical solution, the repeated transmissions of a same physical downlink control channel (PDCCH) are performed in the at least two CORESETs. For example, a plurality of CORESETs are configured, different CORESETs use different candidate beams, and multiple repeated transmissions of a same PDCCH are performed in the plurality of CORESETs. For example, CORESET #1 corresponds to the candidate beam #1, and CORESET #2 corresponds to the candidate beam #2. If the transmission needs to be switched in the candidate beam #1 and the candidate beam #2, and the granularity for each switching is two time units, two transmissions are performed in the PDCCH using the candidate beam #1 in the CORESET #1, and two transmissions are performed using the candidate beam #2 in the CORESET #2. Back and forth like this. In these embodiments, for the definitions of the candidate beams and the candidate beam set, reference may be made to any other embodiment of the present disclosure, which will not be elaborated herein.

Embodiment of the present disclosure also provide a technical solution of beam switching for physical downlink control channel (PDCCH) transmission. The technical solution includes determining beam configuration information. The beam configuration information at least includes a parameter (also referred to as a fourth beam parameter in some embodiments of the present disclosure) configured to indicate two or more candidate beams corresponding to a control resource set (CORESET) for repeated transmissions of the PDCCH, and different candidate beams are used for transmission in the CORESET. The fourth beam parameter is configured to indicate two or more candidate beams in the multiple candidate beams, at least two candidate beams correspond to a same CORESET, and at least two repeated transmissions of a same PDCCH are carried out in the same CORESET using different candidate beams. For example, the existing beam determining method for the CORESET is re-modified. For the same CORESET, multiple candidate beams are activated in the MAC CE. Then, the same CORESET is used for the transmission of the PDCCH, and the used candidate beam is switched when the same CORE-SET is transmitted. For example, the timing of switching the used candidate beam may be determined according to a time parameter.

In some embodiments of the present disclosure, the beam determining method further includes acquiring first information, and the first information is configured to indicate activation of the beam configuration information or deactivation of the beam configuration information.

FIG. 6 is a flow chart showing a beam determining method according to an illustrative embodiment. Referring to FIG. 6, the beam determining method is applied to a terminal, and includes steps S610 and S620.

In step S610, beam configuration information is determined, and the beam configuration information at least includes parameters configured to indicate a receiving beam corresponding to at least one of N repeated transmissions of a downlink channel, where N is a natural number.

In step S620, first information is acquired, and the first information is configured to indicate activation of the beam configuration information or deactivation of the beam configuration information.

In all embodiments of the present disclosure, the order of the steps S610 and S620 as described above may be adjusted arbitrarily. That is, the step S620 of acquiring the first information configured to indicate activation or deactivation of the beam configuration information may be performed at any time slot of the method, which is not limited in embodiments of the present disclosure.

In some embodiments of the present disclosure, the beam switching information further includes a quasi co-location (QCL) hypothesis, or multiple transmission configuration indications (TCIs).

Based on the same concept, embodiments of the present disclosure also provide a beam determining apparatus, which is applied to a network device. FIG. 7 is a block diagram showing a beam determining apparatus according to an illustrative embodiment. Referring to FIG. 7, the beam determining apparatus 700 is applied to a network device. The apparatus 700 includes a parameter determining unit 710 and a transmitting beam determining unit 720.

The parameter determining unit 710 is configured to determine beam configuration information, and the beam configuration information at least includes parameters configured to indicate a receiving beam corresponding to at least one of N repeated transmissions of a downlink channel.

The transmitting beam determining unit 720 is configured to determine a transmitting beam corresponding to the at least one of the N repeated transmissions according to beam parameters corresponding to the at least one of the N repeated transmissions of the downlink channel.

Based on the same concept, embodiments of the present disclosure also provide a beam determining apparatus, which is applied to a terminal. FIG. 8 is a block diagram showing a beam determining apparatus according to an illustrative embodiment. Referring to FIG. 8, the beam determining apparatus 800 is applied to a terminal. The apparatus 800 includes a parameter acquiring unit 810 and a receiving beam determining unit 820.

The parameter acquiring unit 810 is configured to acquire beam configuration information, and the beam configuration information at least includes parameters configured to indicate a receiving beam corresponding to at least one of N repeated transmissions of a downlink channel, where N is a natural number.

The receiving beam determining unit 820 is configured to determine a receiving beam corresponding to the at least one of the N repeated transmissions according to beam parameters corresponding to the at least one of the N repeated transmissions of the downlink channel.

FIG. 9 is a block diagram showing an apparatus 900 for determining a beam according to an illustrative embodiment. For example, the apparatus 900 may be a terminal. The terminal may be a mobile phone, a computer, a digital broadcast terminal, a messaging device, a game console, a tablet device, a medical device, a fitness device, a personal digital assistant, or the like.

Referring to FIG. 9, the apparatus 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the apparatus 900, such as the operations associated with display, phone calls, data communications, camera operations, and recording operations. The processing component 902 can include one or more processors 920 to execute instructions to perform all or some of the steps in the above-described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the apparatus 900. Examples of such data include instructions for any applications or methods operated on the apparatus 900, contact data, phonebook data, messages, pictures, videos, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the apparatus 900. The power component 906 may include a power management system, one or more power sources, and any other components associated with the generation, management, and distribution of power in the apparatus 900.

The multimedia component 908 includes a screen providing an output interface between the apparatus 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and/or the rear camera may receive an external multimedia datum while the apparatus 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone (MIC) configured to receive an external audio signal when the apparatus 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as keyboards, click wheels, buttons, and the like. The buttons may include, but are not limited to, a home button, a volume button, a starting button, and a locking button.

The sensor component 914 includes one or more sensors to provide status assessments of various aspects of the apparatus 900. For instance, the sensor component 914 may detect an open/closed status of the apparatus 900, relative positioning of components, e.g., the display and the keypad, of the apparatus 900, a change in position of the apparatus 900 or a component of the apparatus 900, a presence or absence of user contact with the apparatus 900, an orientation or an acceleration/deceleration of the apparatus 900, and a change in temperature of the apparatus 900. The sensor component 914 may include a proximity sensor configured to detect the presence of nearby objects without any physical contact. The sensor component 914 may further include a light sensor, such as a CMOS or CCD image sensor, for use in imaging applications. In some embodiments, the sensor component 914 may further include an accelerometer sensor, a gyroscope sensor, a magnetic sensor, a pressure sensor, or a temperature sensor.

The communication component 916 is configured to facilitate communication, wired or wireless, between the apparatus 900 and other devices. The apparatus 900 can access a wireless network based on a communication standard, such as WiFi, 2G, 3G, 4G LTE, 5G NR, or a combination thereof. In an illustrative embodiment, the communication component 916 receives a broadcast signal or broadcast associated information from an external broadcast management system via a broadcast channel In an illustrative embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an illustrative embodiment, the apparatus 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the above-mentioned method.

In an illustrative embodiment, there is also provided a non-transitory computer readable storage medium including instructions, such as included in the memory 904, executable by the processor 920 in the apparatus 900, for completing the above-mentioned method. For example, the non-transitory computer-readable storage medium may be a ROM, a random access memory (RAM), a CD-ROM, a magnetic tape, a floppy disc, an optical data storage device, and the like.

Figure 10:
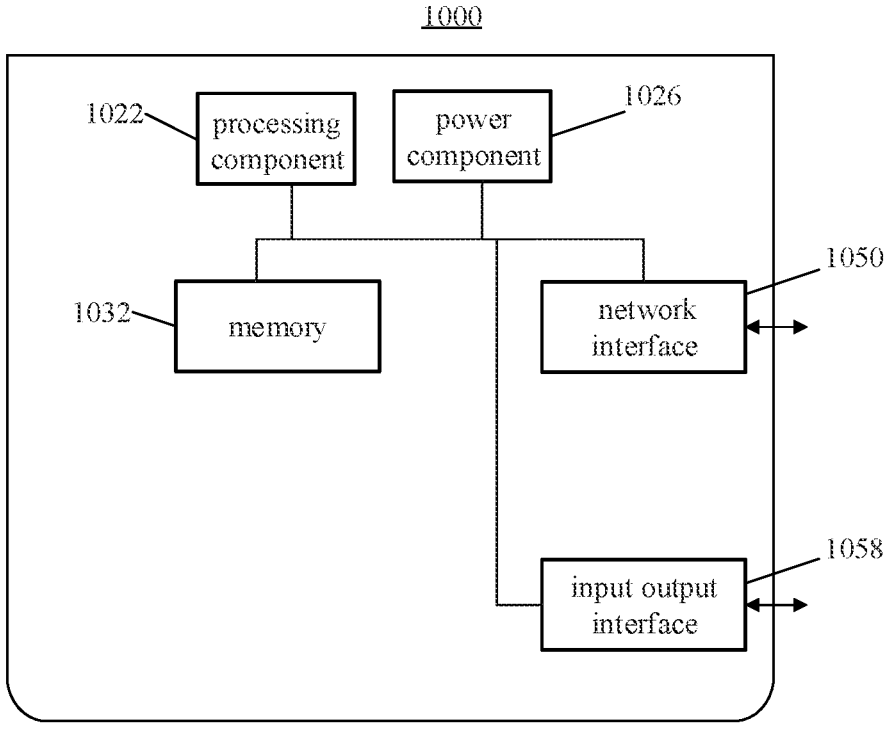
FIG. 10 is a block diagram showing an apparatus for determining a beam according to an illustrative embodiment.

FIG. 10 is a block diagram showing an apparatus 1000 for determining a beam according to an illustrative embodiment. The apparatus 1000 may be a network device. Referring to FIG. 10, the apparatus 1000 includes a processing component 1022, which further includes one or more processors, and a memory resource represented by a memory 1032 for storing instructions, such as an application program, executable by the processing component 1022. The application program stored in the memory 1032 may include one or more modules, and each module corresponds to a set of instructions. Additionally, the processing component 1022 is configured to execute the instructions to perform the above-mentioned methods.

The apparatus 1000 may also include: a power component 1026 configured to perform power management of the apparatus 1000, a wired or wireless network interface 1050 configured to connect the apparatus 1000 to a network, and an input and output (I/O) interface 1058. The apparatus 1000 may operate based on an operating system stored in the memory 1032, such as Windows Server™, Mac OS X™, Unix™, Linux™, FreeBSD™ or the like.

In an illustrative embodiment, there is also provided a non-transitory computer-readable storage medium including instructions, such as the memory 1032 including instructions, and the instructions are executable by the processing component 1022 in the apparatus 1000 for completing the above-mentioned method. For example, the non-transitory computer-readable storage medium may be a ROM, a random access memory (RAM), a CD-ROM, a magnetic tape, a floppy disc, an optical data storage device, and the like.

It is to be understood that, in this disclosure, the term "multiple" or "a plurality of" refers to two or more, and that other quantifiers are similar. The term "and/or" describes an associated relationship of associated objects, and can indicate three relationships. For example, the expression of A and/or B may represent that A exists alone, A and B exist at the same time, and B exists alone. A character "/" generally indicates an "or" relationship of context objects. In addition, "a/an", "said", and "the" in singular forms are intended to include plural forms, unless clearly indicated in the context otherwise.

It is further understood that terms such as "first", "second", and the like are used to describe various information, but these information should not be limited by these terms. These terms are only used for distinguishing information of the same type from each other and do not denote a particular order or a degree of importance. As a matter of fact, the terms such as "first", "second" and the like may be used interchangeably. For example, first information may also be referred to as second information, and similarly, the second information may also be referred to as the first information, without departing from the scope of the present disclosure.

It is further understood that although operations are described in a specific order in the accompanying drawings in embodiments of the present disclosure, it should not be understood that these operations are required to be performed in the specific order shown or in a serial order, or that all of the operations shown be performed to obtain desired results. In certain scenarios, multitasking and parallel processing may be advantageous.

Other embodiments of the present disclosure will be apparent to those skilled in the art from consideration of the specification and practice of the present disclosure described here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A beam determining method, applied to a network device, comprising:

determining beam configuration information, wherein the beam configuration information at least comprises parameters configured to indicate receiving beams corresponding to at least two of N repeated transmissions of a downlink channel, where N is a natural number; and determining transmitting beams corresponding to the at least two of the N repeated transmissions according to beam parameters corresponding to the at least two of the N repeated transmissions of the downlink channel, wherein the receiving beams and the transmitting beams corresponding to the at least two of the N repeated transmissions of the downlink channel are all activated;

the beam configuration information further comprises time granularity configured to indicate beam switching between candidate beams, wherein the time granularity is determined by at least one of:

granularity of frequency hopping, granularity of variation of a pre-coded matrix in a time domain, granularity of redundant version (RV) transformation, or a number of repeated transmissions for a terminal; and the parameters configured to indicate the receiving beams corresponding to the at least two of the N repeated transmissions of the downlink channel comprise at least one of:

beam patterns of the receiving beams corresponding to the at least two of the N repeated transmissions of the downlink channel, the beam patterns corresponding to at least two candidate beams in a candidate beam set; or parameters of at least two control resource sets (CORE-SETs), wherein two repeated transmissions of a same physical downlink control channel (PDCCH) are carried in the at least two CORESETs;

wherein the method further comprises:

sending information with the transmitting beams to the terminal in the at least two of the N repeated transmissions.

2. The method of claim 1, wherein a receiving beam and a transmitting beam corresponding to each of the N repeated transmissions of the downlink channel are not fully identical, or are completely different from each other.

3. The method of claim 1, wherein the parameters configured to indicate the receiving beams corresponding to the at least two of the N repeated transmissions of the downlink channel further comprise:

an identifier configured to identify the at least two candidate beams.

4. The method of claim 3, further comprising:

transmitting the beam configuration information.

5. The method of claim 4, wherein transmitting the beam configuration information comprises:

transmitting the beam configuration information via at least one of downlink control information (DCI) or a media access control element (MAC CE).

6. The method of claim 3, wherein the beam configuration information further comprises a parameter configured to indicate a duration of at least one candidate beam.

7. The method of claim 6, wherein a duration of each candidate beam is indicated by at least one of: an absolute time of transmitting the candidate beam, or a number of repeated transmissions of the candidate beam, wherein the duration is determined by at least one of:

the granularity of frequency hopping, the granularity of variation of the pre-coded matrix in the time domain, the granularity of RV transformation, or the number of repeated transmissions for the terminal.

8. The method of claim 3, wherein the at least two candidate beams correspond to a same CORESET, wherein at least two repeated transmissions of a same PDCCH are carried in the same CORESET, and the at least two repeated transmissions correspond to different candidate beams.

9. A non-transitory computer-readable storage medium having stored therein instructions that, when executed by a processor of a network device, cause the network device to perform the beam determining method of claim 1.

10. A beam determining method, applied to a terminal, comprising:

acquiring beam configuration information, wherein the beam configuration information at least comprises parameters configured to indicate receiving beams corresponding to at least two of N repeated transmissions of a downlink channel, where N is a natural number; and determining receiving beams corresponding to the at least two of the N repeated transmissions according to the beam configuration information, wherein the receiving beams corresponding to the at least two of the N repeated transmissions of the downlink channel are all activated;

the beam configuration information further comprises:

time granularity configured to indicate beam switching between candidate beams, wherein the time granularity is determined by at least one of:

granularity of frequency hopping, granularity of variation of a pre-coded matrix in a time domain, granularity of redundant version (RV) transformation, or a number of repeated transmissions for the terminal; and the parameters configured to indicate the receiving beams corresponding to the at least two of the N repeated transmissions of the downlink channel comprise at least one of:

beam patterns of the receiving beams corresponding to the at least two of the N repeated transmissions of the downlink channel, the beam patterns corresponding to at least two candidate beams in a candidate beam set; or parameters of at least two control resource sets (CORE-SETs), wherein two repeated transmissions of a same physical downlink control channel (PDCCH) are carried in the at least two CORESETs;

wherein the method further comprises:

receiving information with the receiving beams from a network device in the at least two of the N repeated transmissions.

11. The method of claim 10, wherein receiving beams corresponding to the N repeated transmissions of the downlink channel are not fully identical, or are completely different from each other.

12. The method of claim 10, wherein the parameters configured to indicate the receiving beams corresponding to the at least two of the N repeated transmissions of the downlink channel further comprise:

an identifier configured to identify the at least two candidate beams.

13. The method of claim 12, further comprising:

transmitting the beam configuration information.

14. The method of claim 13, wherein transmitting the beam configuration information comprises:

transmitting the beam configuration information via at least one of downlink control information (DCI) or a media access control element (MAC CE).

15. The method of claim 12, wherein the beam configuration information further comprises a parameter configured to indicate a duration of at least one candidate beam.

16. The method of claim 15, wherein a duration of each candidate beam is indicated by at least one of an absolute time of transmitting the candidate beam, or a number of repeated transmissions of the candidate beam, wherein the duration is determined according to at least one of:

the granularity of frequency hopping,
the granularity of variation of the pre-coded matrix in the time domain,
the granularity of RV transformation, or
the number of repeated transmissions for the terminal.

17. The method of claim 12, wherein the at least two candidate beams correspond to a same CORESET, wherein at least two repeated transmissions of a same PDCCH are carried in the same CORESET, and the at least two repeated transmissions correspond to different candidate beams.

18. A terminal, comprising:

a processor; and a memory for storing instructions executable by the processor, wherein the processor is configured to perform the beam determining method of claim 10.

19. A non-transitory computer-readable storage medium having stored therein instructions that, when executed by a processor of a terminal, cause the terminal to perform the beam determining method of claim 10.

20. A network device, comprising:

a processor; and a memory for storing instructions executable by the processor, wherein the processor is configured to: determine beam configuration information, wherein the beam configuration information at least comprises parameters configured to indicate receiving beams corresponding to at least two of N repeated transmissions of a downlink channel, where N is a natural number; and determine transmitting beams corresponding to the at least two of the N repeated transmissions according to beam parameters corresponding to the at least two of the N repeated transmissions of the downlink channel, wherein the receiving beams and the transmitting beams corresponding to the at least two of the N repeated transmissions of the downlink channel are all activated;

the beam configuration information further comprises:

time granularity configured to indicate beam switching between candidate beams, wherein the time granularity is determined by at least one of:

granularity of frequency hopping,
granularity of variation of a pre-coded matrix in a time domain,
granularity of redundant version (RV) transformation, or a number of repeated transmissions for a terminal; and the parameters configured to indicate the receiving beams corresponding to the at least two of the N repeated transmissions of the downlink channel comprise at least one of:

beam patterns of the receiving beams corresponding to the at least two of the N repeated transmissions of the downlink channel, the beam patterns corresponding to at least two candidate beams in a candidate beam set; or parameters of at least two control resource sets (CORE-SETs), wherein two repeated transmissions of a same physical downlink control channel (PDCCH) are carried in the at least two CORESETs;

wherein the processor is further configured to:

send information with the transmitting beams to the terminal in the at least two of the N repeated transmissions.

\* \* \* \* \*